UNITED STATES PATENT OFFICE.

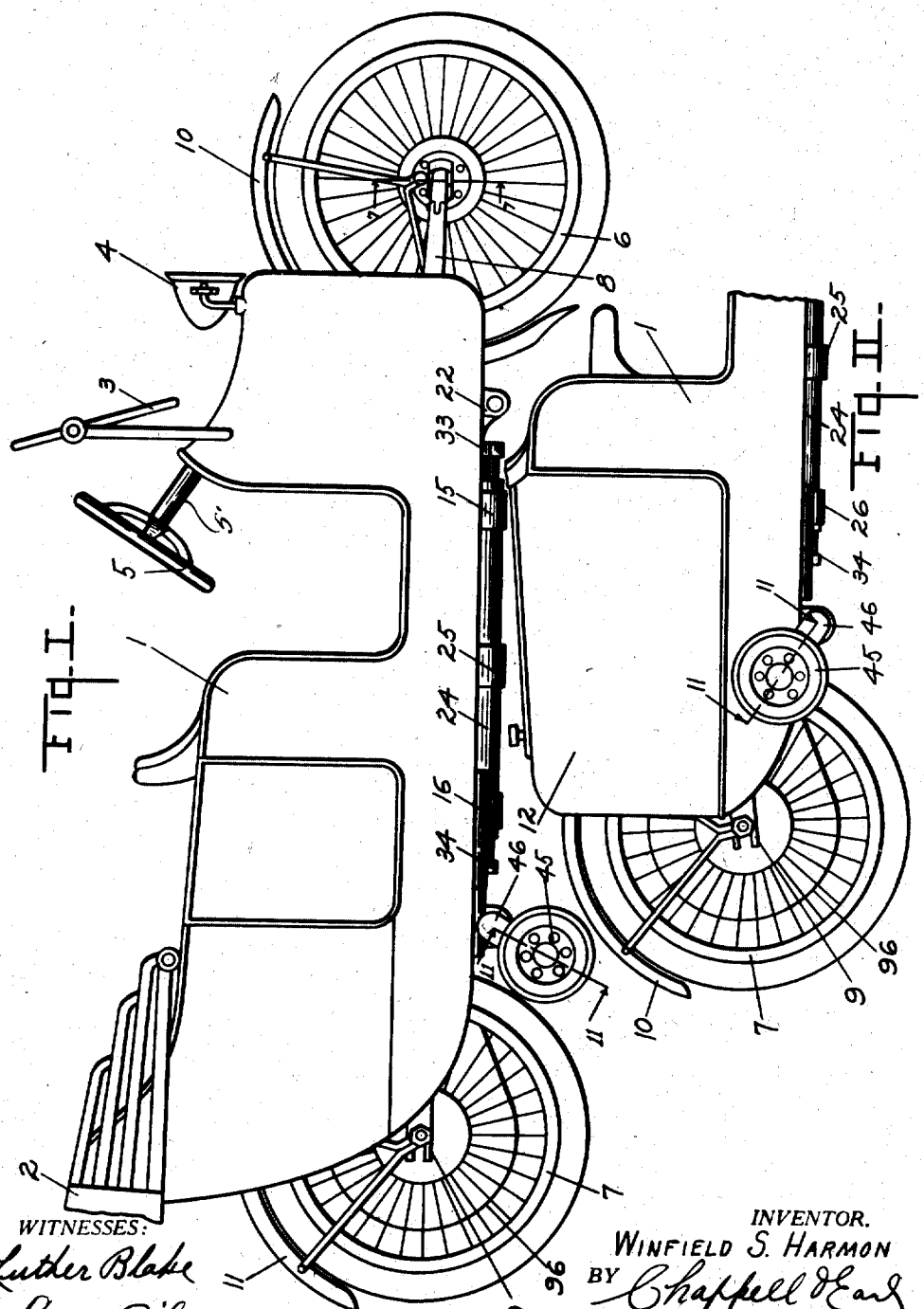

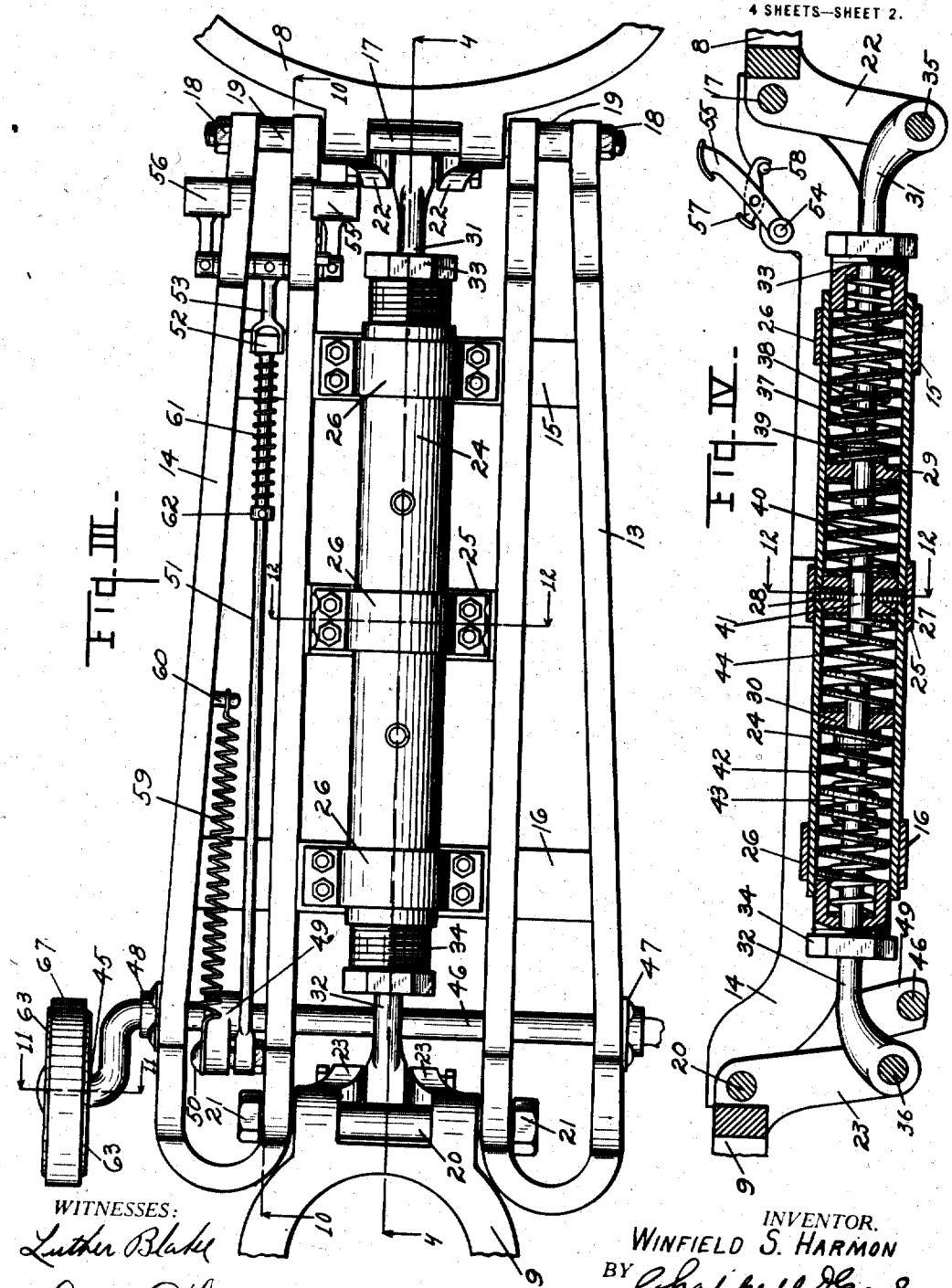

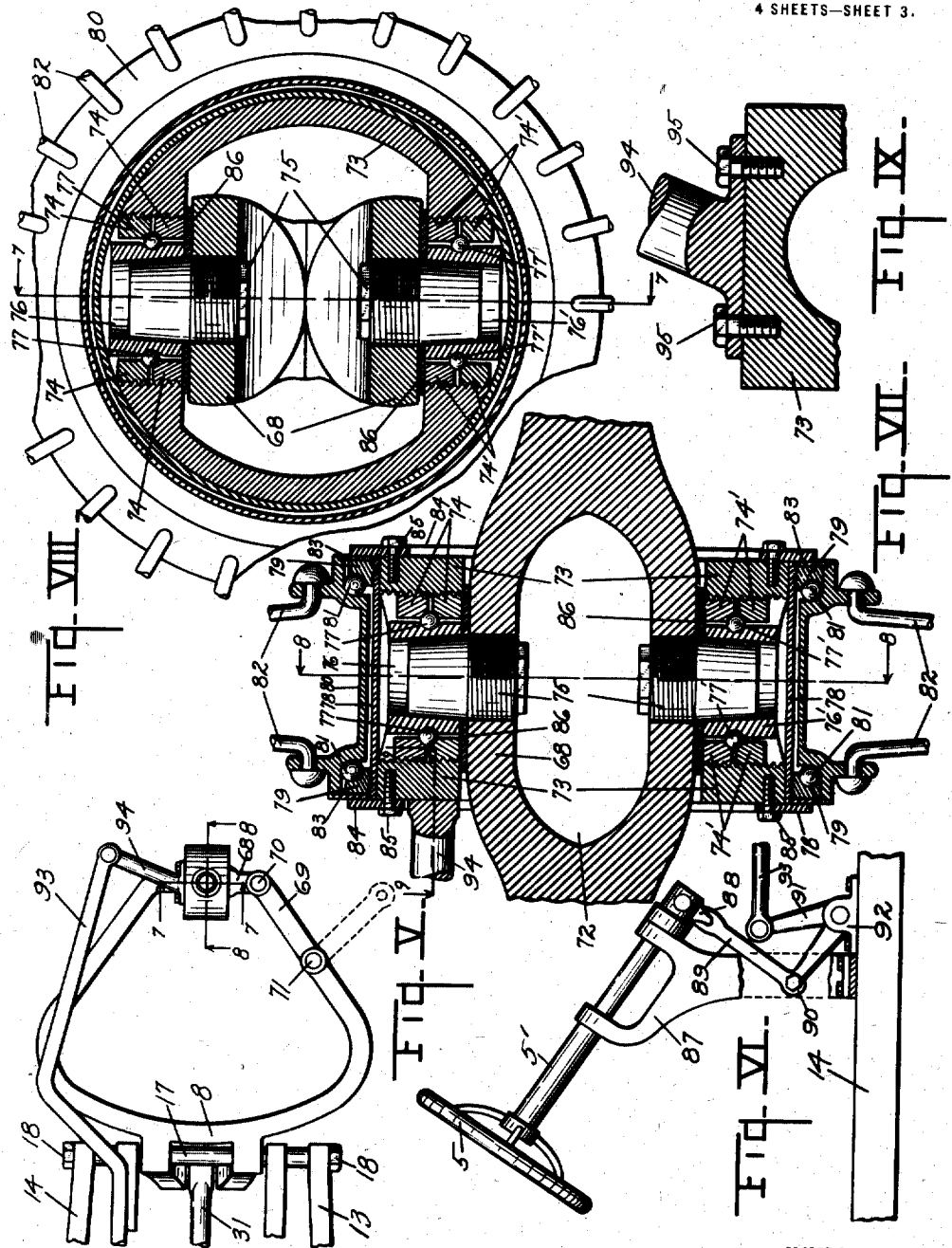

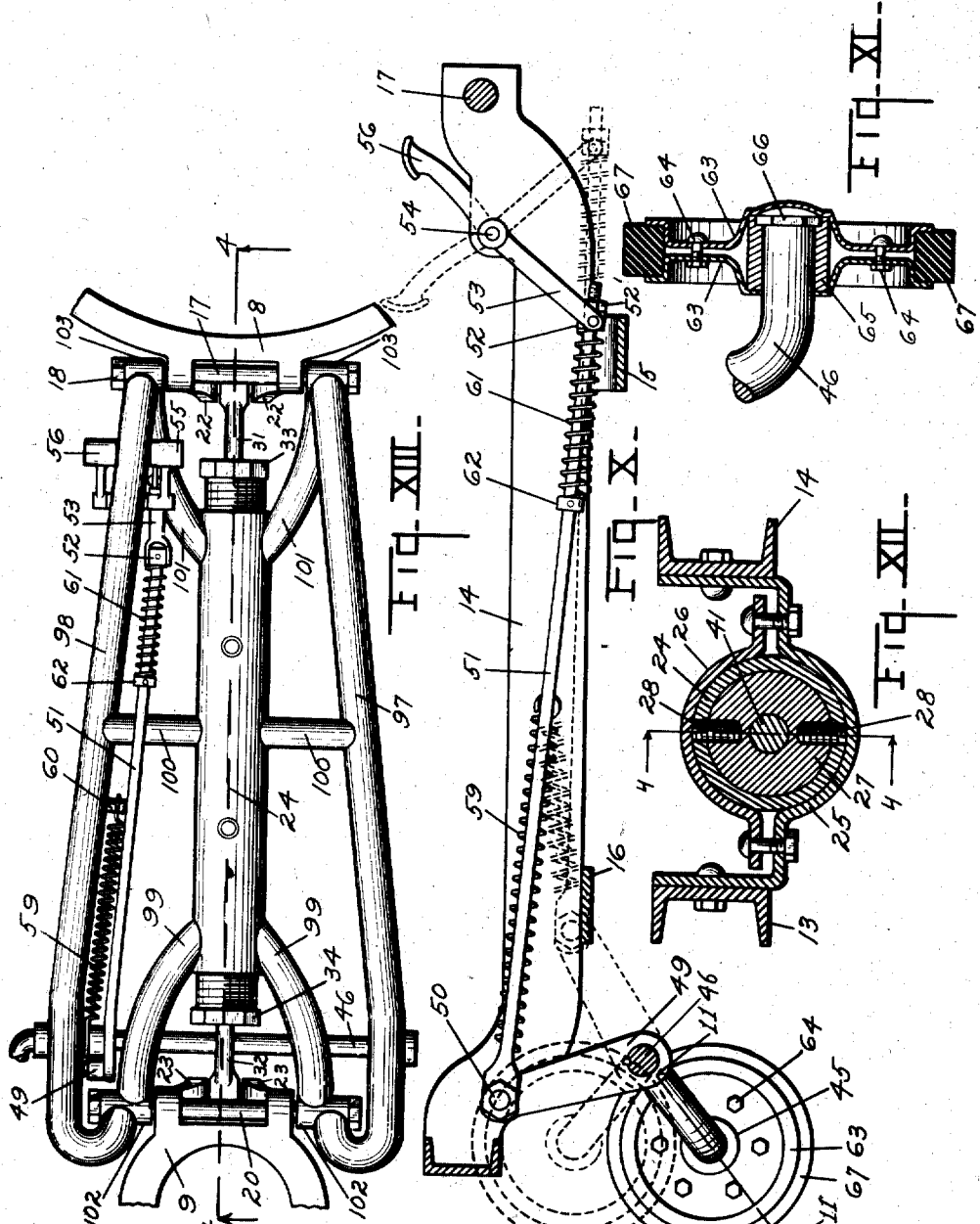

WINFIELD S. HARMON, OF DETROIT, MICHIGAN.

MOTOR-CYCLE.

1,249,751.　　　Specification of Letters Patent.　　Patented Dec. 11, 1917.

Application filed March 4, 1916. Serial No. 82,200.

*To all whom it may concern:*

Be it known that I, WINFIELD S. HARMON, a citizen of the United States, residing at Detroit, Michigan, have invented certain new and useful Improvements in Motor-Cycles, of which the following is a specification.

This invention relates to improvements in motor cycles.

The main objects of this invention are:

First, to provide a motor cycle structure wherein a suitable body may be incorporated with the same, thus making a two wheel automobile.

Second, to provide a motor cycle having an improved mounting of the front and rear forks.

Third, to provide an improved steering means.

Fourth, to provide an improved motor cycle having an improved stabilizing means which may be used when the driver so desires.

Fifth, to provide a motor cycle having improved spring or shock absorbing means which are wholly inclosed in a suitable casing, thereby making the same dust and dirt proof and which insures an easy riding vehicle.

Sixth, to provide a motor cycle having an improved front wheel mounting and construction which permits the same to be easily and quickly adjusted, removed or replaced.

Further objects, and objects relating to details and economies of construction and operation will definitely appear from the detailed description to follow.

I accomplish the objects of my invention by the devices and means described in the following specification. The invention is clearly defined and pointed out in the claims.

Structures constituting a preferred embodiment of my invention are illustrated in the accompanying drawing, forming a part of this specification, in which:

Figure I is a side elevation of a motor cycle, having a body incorporated with the same, embodying the features of my invention.

Fig. II is a partial detail side elevation of a motor cycle embodying the features of my invention having the same body adapted and changed to a delivery car.

Fig. III is an enlarged detail plan view of the frame work of my motor cycle, with the body removed, and showing the arrangement of the springs, stabilizing guard wheels and the front and rear forked construction and mounting.

Fig. IV is an enlarged detail vertical section through the spring means of my motor cycle, showing the connection of the same to the front and rear forks, taken on line 4—4 of Figs. III, XII and XIII.

Fig. V is a partial plan view of the front fork, with the front wheels removed, showing the construction of the same.

Fig. VI is a partial side elevation showing the steering wheel column mounting and connections to the front fork.

Fig. VII is an enlarged detail vertical section through the front axle and wheel hub showing the construction, mounting and arrangement of the front wheel on the same, taken on a line corresponding to line 7—7 of Figs. V and VIII.

Fig. VIII is an enlarged detail vertical section through the front axle showing the construction, mounting and arrangement of the front wheel on the same, taken on a line corresponding to line 8—8 of Figs. V and VII.

Fig. IX is an enlarged partial detail horizontal section showing the connection of the front wheel steering arm 94 to the front axle hub 73, taken on a line corresponding to line 9—9 of Fig. VII.

Fig. X is a detail vertical section showing the pedal connection and means for operating the stabilizing guard wheels, taken on a line corresponding to line 10—10 of Fig. III.

Fig. XI is an enlarged detail vertical section showing the mounting and construction of the stabilizing guard wheels, taken on line 11—11 of Figs. I, II, III and X.

Fig. XII is an enlarged detail vertical section showing the method of supporting the spring cylinder to the frame of my machine, and the method of securing the spring stop within the said cylinder, taken on a line corresponding to line 12—12 of Fig. IV.

Fig. XIII is a detail plan view of the frame of my machine wherein a tubular construction of the frame has been used.

In the drawing, similar reference characters refer to similar parts throughout the several views, and the sectional views are taken looking in the direction of the little arrows at the ends of the section lines.

My improved motor cycle consists of a frame for the same, to be hereinafter described, on which is mounted the body 1, which in Fig. I is preferably two seated, having the top 2, the wind shield 3, front lamp 4 and steering wheel 5, in the usual form except the seats are only wide enough for one person. The front and rear wheels 6 and 7 are mounted on the front and rear forks 8 and 9, respectively, and have the usual front and rear mud guards 10 and 11, respectively, suitably secured to the said forks. The front and rear fork construction will be hereinafter described in detail.

In Fig. II, I show a modification of the body 1 with the rear seat or tonneau removed and a box-like structure 12 substituted, which enables the motor cycle to be used in delivery service and for use of a single passenger.

The frame of my machine consists of the symmetrical right and left side bars 13 and 14, respectively, see Fig. III. These side bars may be of channel iron, which is preferred for some kinds of service, the two halves of which are bent toward each other thus forming a forked or U-shaped structure as shown, and have their front and rear ends curved upwardly as shown in Fig. IV to accommodate the design. These parts are rigidly connected by suitable front and rear bars 15 and 16, respectively. In the front of the frame is secured the front fork rod 17 by the nuts 18, on which pivots front fork 8. Thimbles 19 on the said rod 17 serve to suitably separate the ends of the frame side bars, as shown in Fig. III. In the rear of the frame is secured the rear fork rod 20 by the nuts 21 and pivotally mounted thereon is the rear fork 9. The front fork 8 has a rearwardly and downwardly depending pair of arms 22, and rod 17 preferably passes through the top of the said arms, as shown in Figs. III and IV. The rear fork 9 also has a pair of similarly disposed depending arms 23, which are pivoted on rod 20 in a manner corresponding to that of the front fork.

A spring tube or cylinder 24 is disposed between side bars 13 and 14, and is secured to the cross bars 15 and 16, and an intermediate cross bar 25, (Fig. XII) by the straps 26, suitably bolted to the said cross bars. Within the said tube I have disposed my spring means which serves to absorb the various shocks given to a machine of this type. Within the spring tube and secured to the wall thereof is the centrally disposed stop 27 secured to the said tube by the screw studs 28. In the front half of the said tube is plunger 29, and in the rear is plunger 30. The said plungers 29 and 30 are secured to the front and rear plunger rods 31 and 32, respectively. These rods pass through the front and rear cylinder caps 33 and 34, respectively, which screw into the front and rear ends of the tube 24. The said plunger rods 31 and 32 are bent downwardly, and the rod 31 connects by pin 35 to the lower ends of arms 22 of the front fork and rod 32 connects by pin 36 to the lower ends of arms 23 of the rear fork.

Between the plunger 29 and cap 33 is disposed the coiled spring 37, said spring being loosely incased by the cylinder 24. Disposed inside of spring 37 and fitting over plunger rod 31 is an auxiliary coiled spring 38, one end of which is sprung into a suitable recess in cap 33. This auxiliary spring is adapted to be brought into action when an excessive shock is given to the front wheel and is thereby transmitted by the front fork to the spring 37. For this reason the other end of spring 38 does not normally contact with the step 39 of plunger 29. It is evident, therefore, that when the front fork is lifted, or the frame depressed, the plunger rod 31 is drawn forward and the spring 37 will immediately react, but if the said spring cannot absorb all of the shock thus given, auxiliary spring 38 will be brought into play by the stop 39 bearing against the same and thereby gives an additional means for completely absorbing the shock.

Between plunger 29 and stop 27 is located the coiled spring 40, easily sliding in the spring cylinder 24. This spring bears against suitable washers disposed on the said plunger and stop as shown. Therefore when a shock tends to tilt the front fork downwardly in relation to the frame, the plunger rod 31 will be pushed in and said spring 40 will serve to absorb the said shock. As such a shock of this type is rarely of a violent character, I employ only one spring to absorb the same, but am aware that an auxiliary spring might be here incorporated, if necessary. However, plunger rod 31 is limited in its rearward travel by the axially disposed stop rod 41 secured in stop 27.

I have thus described my spring means in connection with the front fork. A similar means is employed for the rear fork, all as shown in Fig. IV, there being the coiled spring 42 and auxiliary spring 43 between plunger 30 and cap 34, which are adapted to absorb a shock which lifts the rear fork in relation to the frame. A coiled spring 44 between plunger 30 and stop 27 serves to absorb any shock tending to tilt the rear fork downwardly while any excessive forward movement of plunger rod 32 is stopped by the stop rod 41. A varying tension may be put on the springs which I here employ by means of adjusting the front and rear cylinder caps 33 and 34, which are shown screw-threaded for the purpose. By inclosing the said springs in the cylinder 24, the former are made absolutely dirt and dust tight. The same may be very easily lubricated by suitable oil holes in the top of the cylinder, (the chamber being preferably filled) and thereby reduce any squeak or noise which would be liable to occur. The auxiliary springs really serve as shock absorbers, as they are principally brought into play when the machine receives a violent jolt or shock with its consequent rebound.

When my machine is stationary, or is being started, I employ a pair of guard wheels 45 for supporting the same, which may be raised or lowered, as hereinafter described, when the driver so desires. These guard wheels project outside of the body of my car, as shown in Figs. I and II. The said wheels are journaled onto the ends of the guard wheel shaft 46. This shaft is suitably journaled in bearings 47 and 48 secured to the frame side bars 13 and 14. The portions of the shaft projecting beyond the said side bars are so bent that a crank shaft is really formed, the wheels being journaled to the same, as shown. This, therefore, gives a throw to the said wheels when the shaft 46 is rocked, which is equivalent to raising and lowering them. On shaft 46 and between the two members of side bar 14 is keyed the rocker arm 49.

On the pin 50 secured to the said rocker arm is pivoted one end of the foot pedal rod 51. On the other end of rod 51 loosely fits the block 52 which is prevented from sliding off the said rod by the nut 52′ (Fig. X). From each side of block 52 project pins on which are journaled the yoke or forked end of the pedal rocker arm 53. Rocker arm 53 is securely pinned to the foot pedal rocker shaft 54, said shaft 54 being journaled in each member of side bar 14. The foot pedals 55 and 56 are secured to the said rocker shaft 54 where the latter projects from each of the said side members, as shown in Fig. III. Foot pedal 55 is located inside of the body 1 while foot pedal 56 is located outside of the body, thereby giving a means for actuating the same from either inside or outside of the machine.

It is therefore evident that when the said foot pedals are actuated, the guard wheel shaft 46 will be turned and thereby raise or lower the guard wheels as desired. This movement is shown in Fig. X, where the guard wheel is down, as indicated by the full lines, and the foot pedal 56 is forward and up, as shown by full lines. Both foot pedals 55 and 56 are held in this forward position by a suitable catch 57 pinned to pedal 55, (Fig. IV) and adapted to engage the pin 58 secured to the inner member of the frame side bar 14 merely by the forward depression of said pedal. This catch, however, is so designed that the same may be disengaged by the pressure of the foot on the same, and is comparable to the clutch pedal catch in common use on many automobiles.

The normal position of the guard wheels 45 is when the same are raised, as shown dotted in Fig. X. They are retained in this position by the spring 59 connecting the pin 50 and the pin 60 secured to the frame side bar 14, (Fig. III).

Block 52 is normally held against nut 52′ by the coiled spring 61 around rod 51 and bearing against a collar 62 pinned to the said rod. However, when the guard wheels are down and the machine is going over rough roads, the same will be jolted up and down and the said jolting is taken care of by the rod 51 sliding in block 52. It is thus evident that this will in no way affect the pedals 55 and 56. When the pedals are forward and the catch 57 is engaged, the pressure of the foot will disengage the said catch and the spring 59 will automatically lift the guard wheels. Should it be desired to lower the same instantly, the foot pedals may be pushed forward and the same will automatically be caught and retained in this position.

I have thus provided a simple and easy means for balancing my machine when the same is stationary, and when it is starting up or slowing down. It is evident, however, that when the machine has obtained sufficient headway, the same may be readily balanced by the driver and the guard wheels may remain elevated. A detail of the guard wheels is shown in Fig. XI, the said wheels consisting of a pair of sheet metal stampings 63 secured together by the bolts 64 and securely retaining at their hubs the bushing 65 which journals onto the shaft 46. The screw 66 engages shaft 46 and serves to retain the wheel on the said shaft, a slot in the outside of the hub permitting the screw to be turned by means of a screw driver. On the periphery of the wheel is a rubber or other cushion tire or tread 67.

A plan view of the front fork is shown in Fig. V. Normally the fork lies horizontally instead of angularly, as is usual in motor cycles, and the same have a considerable bow at the rear but forwardly converge, as shown. The front axle is detachably secured to the front end of the fork. From the previous description, it is seen that the fork is not permitted to turn to allow the machine to take a curve. The front axle 68 is rigidly secured to the left hand fork member and is detachably secured to the fork hinge link 69 by the pin 70. Hinge link 69 is pivotally mounted to the right hand fork member by pin 71. The front axle 68 is enlarged at its center and has a centrally disposed slot 72 running transversely through it, as shown in Fig. VII.

Over the enlarged central portion of axle 68 is located the axle hub 73. This hub is nearly circular and the top and bottom portions of the same are thicker and heavier than the corresponding side portions, as shown in Fig. VIII. In the said top and bottom portions of the same is a threaded perforation adapted to receive the upper and lower ball bearing race way halves 74 and 74′, all of which are similar to each other. Through the upper and lower central portions of axle 68 is the threaded hole for receiving the thimbles 75. The projecting portions of these thimbles are tapered and are adapted to receive the upper and lower inner ball race ways 76 and 76′. Between the raceways 76 and 74, 76′ and 74′, are located the bearing balls 77 and 77′.

It is therefore evident, with the axle mounted as I have hereinabove described, that the axle hub 73 will be permitted to turn with thimbles 75 as pivots. Around the axle hub 73 is secured the collar 78, the ends of which are suitably threaded. The threaded portions of the said collar are adapted to secure and engage a pair of outer ball bearing race ways or cones 79. The hub 80 of the front wheel is constructed and adapted to form the inner ball bearing race ways for the same. There are two sets of bearing balls 81 adapted and disposed between the said race ways. The usual wire spokes 82 engage the hub and rim and are secured as usual to the same. The outer race ways 79 are held in place by the washers 83 adapted to slip over collar 78 and engage a recessed annular ring on said hub 80. Washers 83 are held in place by the rings 84 secured by the screws 85 to the axle hub 73. The arrangement of all these parts is shown in Fig. VII, and it will be evident that the front wheel will easily turn on the ball bearings 81 while the said wheel may be steered by turning on the ball bearings 77 and 77′. It is thus seen that in steering, the wheel turns within the front fork 8 on a vertical bearing and the bowed portions of the same limit the said turning. Between hub 73 and axle 68 are the felt washers 86 for keeping the bearings dust proof.

Therefore to remove the front wheel, it is only necessary to unscrew the two thimbles 75 until they meet at the center of slot 72. The tapered ends of the two will be completely disengaged from the race ways 76 and 76′, and the link 69 can then be swung outwardly on pivot 71, as indicated by the dotted lines in Fig. V, and the wheel may be withdrawn from axle 68. When the same is to be reassembled, the process is reversed and the tightening up of the said thimbles secures the same to the race ways due to the tapered fit of the two. Should it be desired to remove the front wheel 6, it is only necessary to remove one of the rings 84, washer 83 and unscrew one of the raceways 79 and the hub 80 can then be easily withdrawn from the collar 78.

The steering of my motor cycle is accomplished by the hand steering wheel 5 and column 5′ suitably mounted in the steering wheel bracket 87 secured to the frame side bar 14. On the end of the steering wheel column 5′ is secured the steering wheel arm 88. Arm 88 is connected by link 89 to arm 90 of bell crank 91 suitably fulcrumed in bearings 92 secured to the said side bar 14. Bell crank 91 connects by rod 93 to the front wheel steering arm 94. Said arm 94 is secured to the axle hub 73 by the bolts 95, as shown in Fig. IX. Therefore, when steering wheel 5 is turned, the motion of the end of steering arm 88 will be to raise or lower the same. This, in turn, will raise or lower link 89 thereby actuating bell crank 91 and rod 93 to turn the front wheel, as desired. Each member of the rear fork 9 is parallel to each other with the rear wheel 7 suitably disposed and journaled between the same. My machine is here preferably driven by the belt 96, or a sprocket chain. My invention does not pertain to the power plant, and I have not shown any. The machine may be driven by electricity, steam, or internal combustion engine. The application of such power plants is well known and needs not illustration.

In Fig. XIII is shown a modified structure of the frame wherein the side bars and cross bars are tubular in section and similar to the regular bicycle construction. The frame has the usual spring cylinder 24, while the side bars 97 and 98 are tubular and connected to the spring cylinder by the cross members 99, 100 and 101. Cross members 99 and 101 suitably connect side bars 97 and 98 by means of the hubs 102 and 103, respectively. Where all these tubular parts join, the same are secured by brazing. Through the hubs 102 and 103 run the usual rear and front fork rods 20 and 17. The tubular structure is very light and desirable for high grade work.

I have illustrated and described my improvement in detail in the form in which I have embodied the same for the market. I have not attempted to illustrate or describe certain modifications and variations in structural details, which I contemplate, as I believe the disclosure made will enable those skilled in the art to which my invention relates to embody or adapt my improvements as conditions may require. I desire, however, to be understood as claiming my improvements specifically in the form illustrated, as well as broadly within the scope of the appended claims.

Having thus described my invention, what I claim as new and desire to secure by Letters Patent is:

1. In a motor cycle structure, the combination with a main frame made up of side bars folded upon themselves, a horizontally disposed rearwardly projecting rear fork with downwardly projecting arms disposed and pivoted on a transverse horizontal pivot between the sides of the said frame with a rear wheel carried thereby, a horizontally disposed forwardly projecting front fork with downwardly projecting arms, the fork arms of which are widely separated to permit the swinging of the forward wheel on its pivot in steering disposed and pivoted on a transverse horizontal pivot between the sides of said frame toward the front, a cylindrical spring casing disposed beneath the frame and below the said fork pivots, plunger rods connected to the lower ends of the said downwardly projecting arms, plungers within the spring casings connected to said plunger rods, compression springs disposed within the said cylindrical casing and embracing the said plunger rods coacting with said plungers to hold the said forks yieldingly in position, a hinged portion to one of said front fork arms to facilitate the removal of the wheel, and an axle with axle hub for carrying the said wheel.

2. In a motor cycle structure, the combination with a main frame made up of side bars folded upon themselves, of a horizontally disposed rearwardly projecting rear fork with downwardly projecting arms disposed and pivoted on a transverse horizontal pivot between the sides of the said frame with a rear wheel carried thereby, a horizontally disposed forwardly projecting front fork with downwardly projecting arms, the fork arms of which are widely separated to permit the swinging of the forward wheel on its pivot in steering disposed and pivoted on a transverse horizontal pivot between the sides of said frame toward the front, a cylindrical spring casing disposed beneath the frame and below the said fork pivots, plunger rods connected to the lower ends of the said downwardly projecting arms, plungers within the spring casing connected to said plunger rods, and compression springs disposed within the said cylindrical casing and embracing the said plunger rods coacting with said plungers to hold the said forks yieldingly in position.

3. In a motor cycle structure, the combination with a main frame made up of side bars folded upon themselves, of a horizontally disposed rearwardly projecting rear fork with downwardly projecting arms disposed and pivoted on a transverse horizontal pivot between the sides of the said frame with a rear wheel carried thereby, a horizontally disposed forwardly projecting front fork with downwardly projecting arms, the fork arms of which are widely separated to permit the swinging of the forward wheel on its pivot in steering disposed and pivoted on a transverse horizontal pivot between the sides of said frame toward the front, rods connected to the lower ends of the said downwardly projecting arms, springs coacting with said rods to hold the said forks yieldingly in position, a hinged portion to one of said front fork arms to facilitate the removal of the wheel, and an axle with axle hub for carrying the said wheel.

4. In a motor cycle structure, the combination with a main frame made up of side bars folded upon themselves, of a horizontally disposed rearwardly projecting rear fork with downwardly projecting arms disposed and pivoted on a transverse horizontal pivot between the sides of the said frame with a rear wheel carried thereby, a horizontally disposed forwardly projecting front fork with downwardly projecting arms, the fork arms of which are widely separated to permit the swinging of the forward wheel on its pivot in steering disposed and pivoted on a transverse horizontal pivot between the sides of said frame toward the front, rods connected to the lower ends of the said downwardly projecting arms, compression springs coacting with said rods to hold the said forks yieldingly in position, and an axle with axle hub for carrying the said wheel.

5. In a motor cycle structure, the combination with a main frame made up of side bars folded upon themselves, of a rear fork with downwardly projecting arms disposed and pivoted on a transverse horizontal pivot between the sides of the said frame with a rear wheel carried thereby, a horizontally disposed forwardly projecting front fork with downwardly projecting arms, the fork arms of which are widely separated to permit the swinging of the forward wheel on its pivot in steering disposed and pivoted on a transverse horizontal pivot between the sides of said frame toward the front, a cylindrical spring casing disposed beneath the frame and below the said fork pivots, plunger rods connected to the lower ends of the said downwardly projecting arms, plungers within the spring casings connected to said plunger rods, compression springs disposed within the said cylindrical casing and embracing the said plunger rods coacting with said plungers to hold the said forks yieldingly in position, and a forward wheel between the fork arms of the said forward fork.

6. In a motor cycle structure, the combination with a main frame made up of side bars folded upon themselves, of a rear fork with downwardly projecting arms disposed and pivoted on a transverse horizontal pivot between the sides of the said frame with a rear wheel carried thereby, a front fork with downwardly projecting arms disposed and pivoted on a transverse horizontal pivot between the sides of said frame toward the front, a cylindrical spring casing disposed beneath the frame and below the said fork pivots, plunger rods connected to the lower ends of said downwardly projecting arms, plungers within the spring casings connected to said plunger rods, compression springs disposed within the said cylindrical casing and embracing the said plunger rods coacting with said plungers to hold the said forks yieldingly in position, a forward wheel between the fork arms of the said forward fork, a pivotal support for the wheel on the axle to permit the same to be turned laterally in steering, a steering means for said wheel, and a steering column with connections to the front axle hub arm for guiding the same, substantially as described.

7. In a motor cycle structure, the combination with a main frame, of a rear fork with downwardly projecting arms disposed and pivoted on a transverse horizontal pivot between the sides of the said frame with a rear wheel carried thereby, a front fork with downwardly projecting arms, the fork arms of which are widely separated to permit the swinging of the forward wheel on its pivot in steering disposed and pivoted on a transverse horizontal pivot between the sides of said frame toward the front, a cylindrical spring casing disposed beneath the frame and below the said fork pivots, plunger rods connected to the lower ends of the said downwardly projecting arms, plungers within the spring casings connected to said plunger rods, compression springs disposed within the said cylindrical casing and embracing the said plunger rods coacting with said plungers to hold the said forks yieldingly in position, and a forward wheel between the fork arms of the said forward fork.

8. In a motor cycle structure, the combination with a main frame, a horizontally disposed rearwardly projecting rear fork with downwardly projecting arms disposed and pivoted on a transverse horizontal pivot between the sides of the said frame with a rear wheel carried thereby, a horizontally disposed forwardly projecting front fork with downwardly projecting arms, the fork arms of which are widely separated to permit the swinging of the forward wheel on its pivot in steering disposed and pivoted on a transverse horizontal pivot between the sides of said frame toward the front, rods connected to the lower ends of said downwardly projecting arms, compression springs coacting with said rods to hold the said forks yieldingly in position, a forward wheel between the fork arms of the said forward fork, and a steering means for said wheel, substantially as described.

9. In a motor cycle structure, the combination of the frame, a horizontally disposed rear fork on a horizontal pivot on the said frame, a rear wheel carried by said fork, a horizontally disposed front fork with widely separated arms to permit the turning of the front wheel in steering, pivoted on a horizontal pivot at the front of said frame, spring connections between the said forks for maintaining them yieldingly in horizontal relation to the said frame, and a front wheel supported on a vertical pivot with means for steering the same, as specified.

10. In a motor cycle structure, the combination of the frame, front and rear forks with lever arm connections, a spring structure disposed between the said arms comprising a spring casing, a central stop partition therein, plunger rods connected to the said fork arms, plungers on the said rods adapted to reciprocate and play within the spring casing, compression springs disposed within the casing and contacting with the said plunger, auxiliary compression springs of lesser length on the said plunger rods disposed to coact with the said plunger after the first said springs have been compressed, compression springs between the plunger heads and the central stop to resist the counter spring action, coacting for the purpose specified.

11. In a motor cycle structure, the combination of a drop frame, front and rear forks pivoted to the said drop frame with depending arms therefrom, spring connection between the said arms, and a body supported on the said frame one seat wide, projecting to embrace both the front and rear wheels, as specified.

In witness whereof, I have hereunto set my hand and seal in the presence of two witnesses.

WINFIELD S. HARMON. [L. S.]

Witnesses:
M. E. TRIPP,
RUTH ANDERSON.

Copies of this patent may be obtained for five cents each, by addressing the "Commissioner of Patents, Washington, D. C."